May 5, 1925.　　　　　　　　　　　　　　　　1,537,038
H. DORAKDJAIN
RAT TRAP
Filed July 25, 1923
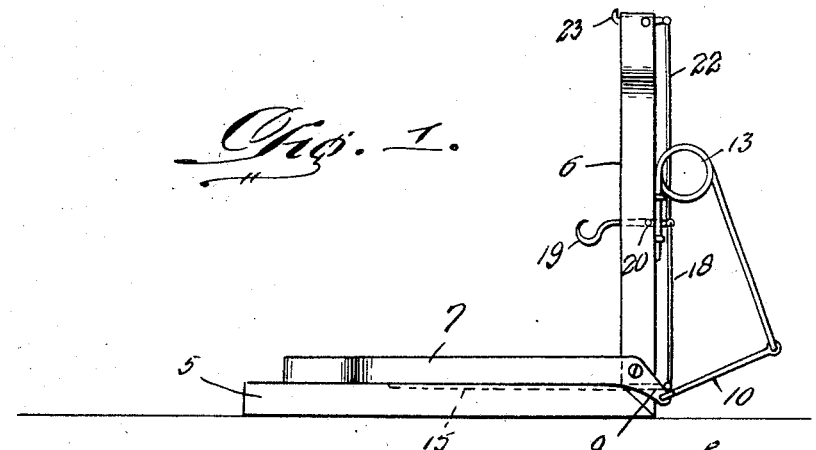
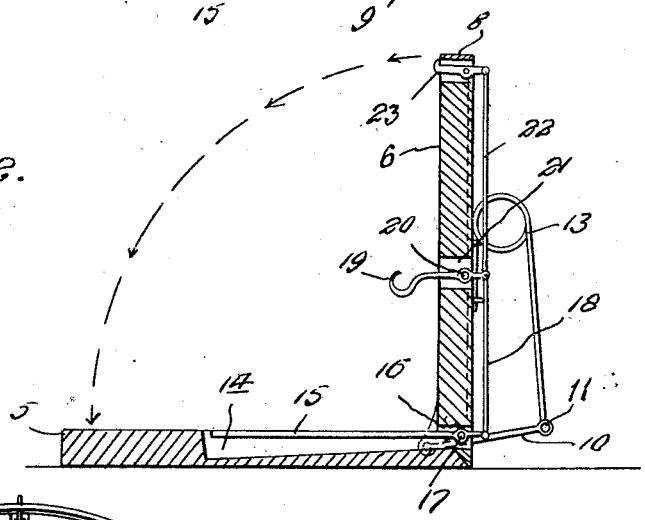
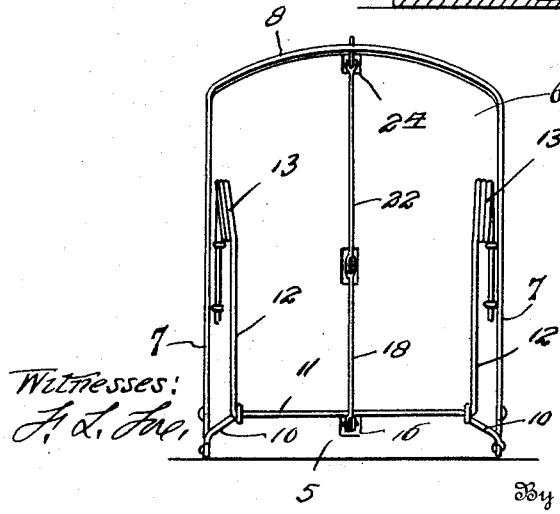
Hovanness Dorakdjain
Inventor Patented May 5, 1925.

1,537,038

UNITED STATES PATENT OFFICE.

HOVANNESS DORAKDJAIN, OF EAST WATERTOWN, MASSACHUSETTS.

RAT TRAP.

Application filed July 25, 1923. Serial No. 653,635.

*To all whom it may concern:*

Be it known that HOVANNESS DORAKDJAIN, a citizen of the United States, residing at East Watertown, in the county of Middlesex and State of Massachusetts, has invented certain new and useful Improvements in Rat Traps, of which the following is a specification.

This invention relates to rat traps and has for its primary object to substantially improve and simplify over the form of rat trap now in use.

An additional object of my invention is to provide such a rat trap wherein the jaw element is maintained in a raised sprung position in a novel and simplified manner, this jaw adapted to be released by both the weight of the animal upon the trap platform or by the attempt of the animal to remove the bait from the usual bait impaling hook.

A still further object is to provide such a rat trap that may be manufactured and marketed at small cost, the invention comprising relatively few parts and these co-related with each other as to reduce the possibility of disarrangement to a minimum.

With the above and other objects in view as the nature of the invention is better understood, the same comprise the construction, combination and arrangement of parts set forth in the following specification, shown in the accompanying drawing and claimed.

In the drawing wherein like reference characters indicate corresponding parts throughout the several views, and wherein:

Figure 1 is an elevational view of one side of my improved trap, the jaw member thereof being shown in an un-set position, Figure 2 is a detail longitudinal section of the trap, the jaw member being shown in set latched position, and Figure 3 is a rear elevational view of my trap.

Now having particular reference to the drawing, my trap embodies the provision of a platform or base board 5 and a vertical backing board 6, which backing board is joined to the edge of said baseboard in a manner desirable.

Pivoted adjacent their ends to the lower end of said backing board are the legs 7 of a relatively U-shaped sheet metal jaw member 8, the portions of these legs beyond the pivotal connections to said backing board being extended downwardly to provide ears 9 as more clearly shown in Figure 1. Loosely connected to the ends of these ear portions are the inner ends of link rods 10 that extend rearwardly and are loosely connected to the opposite ends of a cross rod 11, Figure 3. The opposite ends of this cross rod extend upwardly as at 12 and terminate in coil springs 13, each of which is rigidly secured in a manner preferably as shown to the opposite sides of the rear face of said backing board 6.

The said baseboard 5 is provided centrally upon its top surface with a channel 14, the bottom wall of which is inclined as shown in Figure 2 and within said channel 14, is an animal controlled platform 15 in the form of a strip of sheet metal. The rear end of this platform extends through a passage 16 adjacent the lower end of said backing board 6 and is pivotally secured therein as at 17. Pivotally connected to the projecting end of said platform is one end of an upwardly extending rod 18, the upper end of this rod being pivotally connected to one end of a bait hook 19 that is pivoted intermediate its ends at 20 within an opening 21 of said backing board 6. Also pivotally secured to the projecting end of said bait hook is the lower end of another rod 22, the upper end thereof being pivotally secured to the projecting end of a latch member 23 that is pivotally secured within a channel 24 upon the upper end of the backing board 6, it being of course apparent that this latch member 23 serves as a means for maintaining said jaw 7 in an upwardly swung position as shown in Figure 2.

In the operation of my device suitable bait is impaled upon the hook 19, after which, the jaw 8 is raised to a position parallel with the backing board 6, the same being maintained in such position by the latch element 23, it being of course understood that an upward movement of said jaw will consequently wind up upon the spring elements 13. A rat or other animal stepping upon the platform 15 will naturally force upwardly upon the rods 18 and 22 for consequently releasing the latch element 23 and the springs 13 expanding, the jaw will snap closed thereby trapping the animal.

Should said platform 15 become stuck or otherwise inoperative, the animal tending to remove the bait from the hook 19 will likewise force said rods 18 and 22 upwardly for accomplishing the same purpose.

Numerous advantages of a trap of this character will be at once appreciated by those skilled in the art and even though I have herein set forth the most practical embodiment of the invention with which I am at the present time familiar, it is nevertheless to be understood that minor changes may be made within the invention without departing from the spirit and scope of the appended claim.

Having thus described my invention, what I claim as new and desire to secure by Letters Patent is:

A trap including in combination a base board, a back board fixed to the base board at an angle thereto, a jaw member pivoted to the lower end portion of the back board and at points between the opposite side surfaces thereof, spring means mounted upon the back board for normally maintaining said jaw closed upon the base board, a platform pivoted to the back board at a point between the opposite side surfaces thereof and disposed over the base board, a bait hook pivoted upon the back board at a point between the opposite side surfaces thereof and passing transversely therethrough, a latch member pivoted upon the lower end of said back board at a point between the opposite surfaces thereof and adapted to engage the jaw to hold the same open, and a rod disposed along the back board and pivotally connected with the platform, the bait hook, and the latching member.

In testimony whereof I affix my signature.

HOVANNESS DORAKDJAIN.